March 1, 1932.  C. R. BRADEN  1,847,234
ELEVATOR FOR SOY BEAN HARVESTERS
Filed Feb. 25, 1931

Inventor
Coe R. Braden,
By G. C. Kennedy,
Attorney

Patented Mar. 1, 1932

1,847,234

UNITED STATES PATENT OFFICE

COE R. BRADEN, OF WINTHROP, IOWA

ELEVATOR FOR SOY-BEAN HARVESTERS

Application filed February 25, 1931. Serial No. 518,129.

My invention relates to improvements in elevators for soy-bean harvesters, and the object of my improvement is to supply an attachment for a harvester to cooperate therewith in lifting or elevating, while gathering together, soy-bean plants in a row, while being severed at their stems, and thus permitting them to be carried up over the sickle and upon the carrying apron to binding mechanism, without entangling their shrubby branches and twigs with the sickle or sickle-bar.

Figure 1:
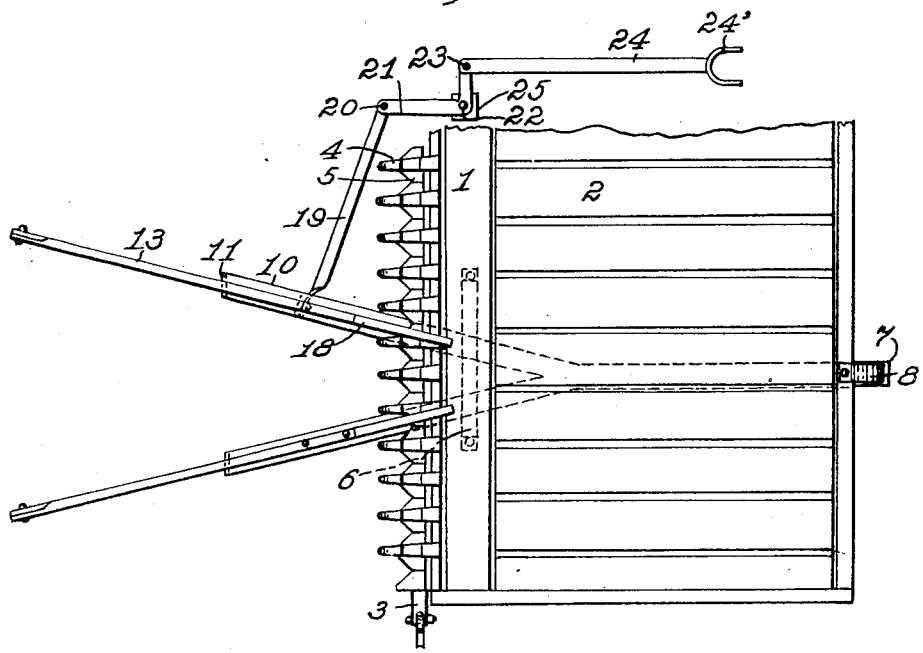
Figure 2:
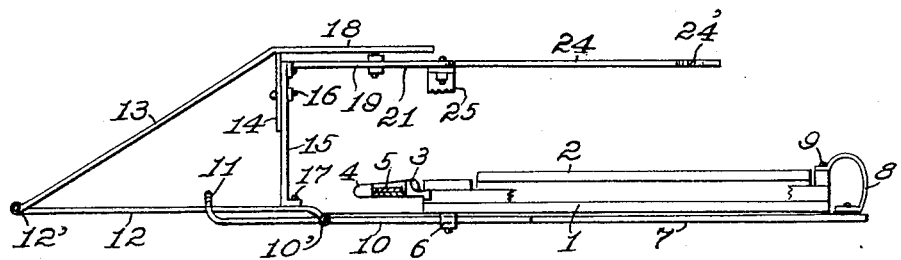

This object I have accomplished by the means which are hereinafter described and claimed, and which are illustrated in the accompanying drawings, in which Fig. 1 is a partial plan view of a harvester, including platform, endless carrier apron, sickle-bar and sickle, and showing my improved elevator attachment associated therewith. Fig. 2 is a side elevation of the same, with parts sectioned or broken away.

Soy-beans are of a bush type, with branching twigs, and ordinarily planted in rows. When reaped by an ordinary harvester, their branches and twigs after their stems are severed by the sickle, are liable to become entangled therewith and with the projecting points of the sickle-bar, causing much delay and possible loss of beans from severed or broken pods. My device is intended to obviate this, and entirely clear the separated plants from entanglement with the reaping elements of the harvester.

The numeral 1 generally denotes the platform of a harvester, having the usual endless carrier apron 2, a sickle-bar 3 and reciprocatory sickle 5 seated in the recessed sickle-bar points or fingers 4.

My improved elevating attachment or device comprises a main base-bar 7 positioned immediately below the platform 1 and having on its rear end a curvate arm 8 to the rear of the platform which overarches and its end secured to the top of the rear frame bar of the platform. The base-bar 7 is divided into a pair of like branches 10 below the platform, which near their division are supported by a spaced hanger-bar 6 end-secured to the bottom of the platform.

These branches 10 project a distance beyond the sickle 5 divergently and have upturned bifurcated terminations 11 in which are seated bars 12, also divergent and in their rear parts overlying the branches 10 a short distance and pivoted at 10' thereto. Upon the forward terminations of the bars 12 are mounted hingedly at 12' the forward ends of the elevator bars 13 which are inclined upwardly and rearwardly with a horizontal part 18 extending over the sickle and sickle-bar. Upon the rear part of each bar 12 is a fixed standard 15 in contact with a hanger 14 from the bar 13, these members being slotted in alinement to receive adjusting bolts 16, to permit raising and lowering of the bar parts 13 and 18 and securing them in vertical adjustments. A horizontal arm 19 is fixed to extend laterally from one standard 15 at the top and is pivotally connected at 20 to one arm of a bell-crank lever 21, whose angle is fulcrumed at 22 on a bracket member 25 part of a binder frame structure not shown. The other arm of said lever is pivoted at 23 to an end of an operating arm 24 having at its other end a U-shaped pedal for use by an operator seated near it for foot actuation, in swinging the gathering and elevating arms 12—13 to and fro horizontally to thus permit the device to be used in following divergencies from alinement of plants in a row.

Soy-beans as planted in a row are of a branching or bushy nature, hence when gathered between the divergent arms 12 and 13, as the latter converge, are by the inclined parts 13 and their continuations 18 lifted when their stems are severed by the sickle, and because of the forward progress of the harvester, are delivered rearwardly upon the traveling apron 2 to be carried thence to a binding mechanism not shown, and without permitting branches or twigs to become entangled in the cutting mechanism.

The body bar 7 and its branches 10 are supported by a depending bracket-bar 6 beneath the platform 1, and as the curvate arm 8 may yield somewhat to permit the bar 7 to swing with its branches slidingly upon the hanger-bar 6, sufficient scope of movement is given to the arms 12 and 13 swingingly. Stops 26 on the branches 10 engage the bar 6, to restrict rear displacements of the bar 7.

Having described my invention, what I claim as new, and desire to secure by Letters Patent, is:

1. The combination with the cutting apparatus of a harvester, of a bar mounted for lateral swinging adjustments beneath the platform carrying said apparatus, said bar having divergent members projecting beyond the apparatus, bars mounted hingedly upon said members in superposed alinement therewith, inclined return bars hinged at their forward ends to the forward ends of the said last mentioned bars and projecting rearwardly above and across the cutting apparatus, and adjustable spacing connections between said hinged bars.

2. The combination with the cutting apparatus of a harvester, of laterally spaced structures connected at their rear parts and mounted beneath the platform of the harvester to project forwardly of the cutting apparatus, said structures being hingedly supported for both vertical play and lateral play, each structure comprising a basal bar and an elevator bar pivoted thereto and inclined upwardly and rearwardly across and over said cutting apparatus, adjustable spacing connections between each basal bar and its hinged elevator bar, and pedally controllable connecting elements to one of said structures operable to swing both structures laterally to and fro.

3. The combination with the cutting apparatus of a harvester, of forwardly projecting horizontally spaced bars mounted upon the harvester to project before the cutting apparatus, arms hingedly mounted on the forward ends of the bars to extend inclinedly rearwardly to deliver rearwardly beyond the cutting apparatus, projections on and between each bar and its hinged arm, and means for releasably fastening the projections together to permit of varying the height of the hinged arm from its supporting bar.

In testimony whereof I affix my signature.

COE R. BRADEN.